(12) United States Patent
Kawashima et al.

(10) Patent No.: US 6,480,642 B1
(45) Date of Patent: Nov. 12, 2002

(54) HYBRID OPTICAL WAVEGUIDE CIRCUIT CHIP, AND METHOD FOR PREDICTING THE CHARACTERISTICS THEREOF

(75) Inventors: Hiroshi Kawashima; Hiroyuki Koshi; Isao Ohyama; Shiro Nakamura, all of Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 09/563,263

(22) Filed: May 1, 2000

(30) Foreign Application Priority Data

Apr. 30, 1999 (JP) ............................................. 11-123585

(51) Int. Cl.[7] ................................................ G02B 6/12
(52) U.S. Cl. ............................... 385/14; 385/15; 385/50
(58) Field of Search ............................. 385/14, 15, 27, 385/39, 50

(56) References Cited

U.S. PATENT DOCUMENTS 4,950,044 A * 8/1990 Makita ..................... 350/96.14
5,347,601 A * 9/1994 Ade et al. ....................... 385/3
5,960,135 A * 9/1999 Ozawa ......................... 385/24
5,978,531 A * 11/1999 Funabashi ..................... 385/45

FOREIGN PATENT DOCUMENTS

JP 9-15440 1/1997

* cited by examiner

*Primary Examiner*—Akm E. Ullah
*Assistant Examiner*—Jennifer Doan
(74) *Attorney, Agent, or Firm*—Armstrong, Westerman & Hattori, LLP

(57) ABSTRACT

A hybrid optical waveguide circuit chip capable of predicting optical characteristics of a first optical waveguide circuit connected to optical elements where it is difficult to measure the optical characteristics. In the chip, a second optical waveguide circuit is disposed adjacent to the first optical waveguide circuit. One end face of the second optical waveguide circuit is terminated at one chip end face A of the chips, and at least one of the optical waveguide end faces at the other side of the second optical waveguide circuit is terminated at the other chip end face B of the chip, wherein the optical characteristics of the second optical waveguide circuit are measured, and the measured values are predicted as substantial optical characteristics of the first optical waveguide.

5 Claims, 5 Drawing Sheets

CORRELATION BETWEEN THE FIRST OPTICAL WAVEGUIDE CIRCUIT AND THE SECOND OPTICAL WAVEGUIDE CIRCUIT WITH RESPECT TO THE UNIFORMITY

Fig.6

HYBRID OPTICAL WAVEGUIDE CIRCUIT CHIP, AND METHOD FOR PREDICTING THE CHARACTERISTICS THEREOF

BACKGROUND OF THE INVENTION

1. Field of the Invention

The present invention relates to a hybrid optical waveguide circuit chip used for optical transmissions, and in particular a method for predicting the optical characteristics of an optical waveguide circuit and a hybrid optical waveguide circuit chip whose structure is improved so that such prediction is enabled.

2. Description of the Related Art

There is available a hybrid optical waveguide circuit chip as one of the methods for increasing the productivity of optical modules used in the field of optical transmissions and for lowering production cost thereof. The hybrid optical waveguide circuit chip is such that optical elements are mounted on an optical waveguide circuit having an optical element incorporating portion, and it has been noted that productivity thereof is excellent, and integration of various optical waveguides and optical elements is enabled.

Figure 6:
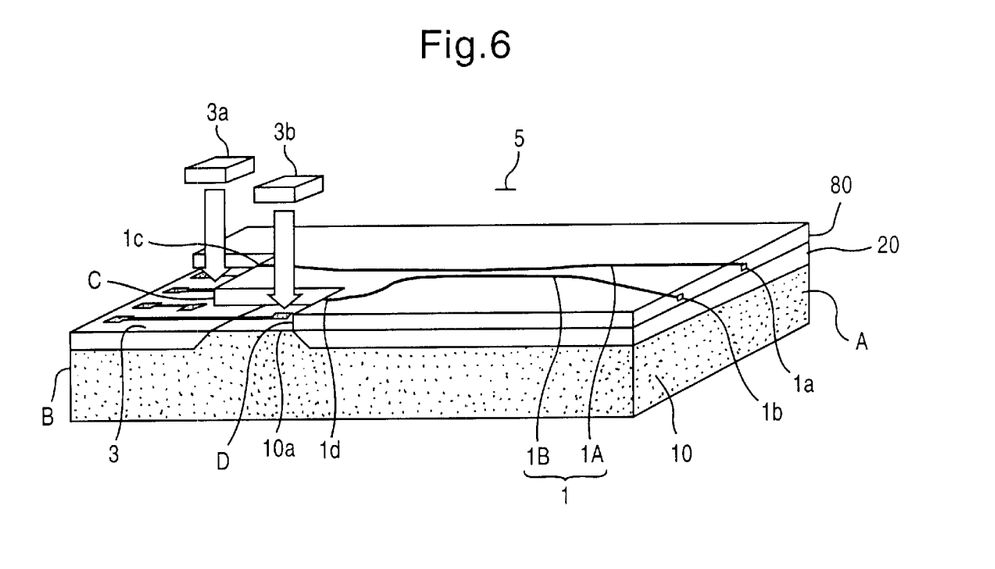
FIG. 6 shows a prior art of hybrid. optical circuit chip.

A description is given of a prior art hybrid optical waveguide circuit chip with reference to FIG. 6. The prior art hybrid optical waveguide circuit chip 5 has the structure shown in FIG. 6. That is, it is composed so that a lower cladding layer 20 is formed on a silicon (Si) substrate 10 and an optical waveguide layer 80 is formed thereon. The first optical waveguide circuit 1 having two cores 1A and 1B is formed on the optical waveguide layer 80. Light receiving and emitting elements 3a and 3b are optical elements incorporated in an optical element incorporating portion 10a, etc., which is provided at an appointed position of a hybrid optical waveguide circuit chip 5. The ends 1a and 1b at one side of the cores 1A and 1B of the first optical waveguide circuit 1 are terminated at the chip end face A of one side of the hybrid optical waveguide circuit chip 5, and the ends at the other side of the cores 1A and 1B of the corresponding first optical waveguide circuit 1 are terminated at respective end faces C and D of the optical waveguide layer 80 facing the boundary portion at the surrounding area 3 of the optical element incorporating portion.

It is necessary that the optical characteristics of the first optical waveguide circuit 1 formed in the hybrid optical waveguide circuit chip 5 are measured before shipment of the chip 5. However, if the optical characteristics are measured after optical elements are incorporated in the optical element incorporating portion, such a disadvantage arises in that the optical elements once incorporated will become useless if the measured values slip outside the standards or the limits. Therefore, if an attempt to measure the optical characteristics is made before incorporating the optical elements in the optical element incorporating portion to avoid the above disadvantage, the optical elements could not be measured by connecting optical fibers to both end faces of a chip because the other ends 1c and 1d of the cores 1A and 1B of the first optical waveguide circuit 1 are not terminated at the other chip end face B of the hybrid optical waveguide chip 5. That is, the end faces 1c and 1d of the cores 1A and 1B are terminated at the end face of the optical waveguide layer 80 having a level gap with respect to the surface of the silicon substrate 10, wherein because the height of the optical axis of the end faces 1c and 1d from the surface of the silicon substrate 10 is less than the radius of the optical fibers, it becomes difficult for the end faces 1c and 1d and the optical fibers to be connected with the optical axes aligned with each other.

Based on the above description, it is highly necessary that, before incorporating optical elements in the chip 5, the optical characteristics of the first optical waveguide circuit 1 of the hybrid optical waveguide circuit chip are easily measured and predicted at high accuracy. However, no method applicable to real applications has been developed yet.

SUMMARY OF THE INVENTION

The present invention was developed to solve the above-mentioned shortcomings and problems, and it is therefore an object of the invention to provide a hybrid optical waveguide circuit chip having the following construction. That is, the invention provides a hybrid optical waveguide circuit chip comprising an optical element incorporating portion in which optical elements are incorporated, and a first optical waveguide circuit optically connected to said optical elements, wherein a second optical waveguide circuit is disposed adjacent to said first optical waveguide circuit, one end face of said second optical waveguide circuit is terminated at one chip end face of the hybrid optical waveguide circuit chip, and at least one of the optical waveguide end faces at the other end face of said second optical waveguide circuit is terminated at the other chip end face of the hybrid optical waveguide circuit chip.

A hybrid optical waveguide circuit chip according to another aspect of the invention is featured in that one end face of the first optical waveguide circuit at said hybrid optical waveguide circuit chip is terminated at one chip end face of the hybrid optical waveguide circuit chip, and the other end face of said first optical waveguide circuit is terminated at the respective end faces of optical waveguide layers at the boundary portion at the surrounding area of the optical element incorporating portion.

A hybrid optical waveguide circuit chip according to further another aspect of the invention is featured in that portions which determine the appointed optical characteristics of both the first optical waveguide circuit and the second optical waveguide circuit in said hybrid optical waveguide circuit chip are formed so as to have the same shape.

A hybrid optical waveguide circuit chip according to still another aspect of the invention is featured in that the first and second optical waveguide circuits in the hybrid optical waveguide circuit chip are optical waveguide circuits of a two-by-two directional coupler.

A hybrid optical waveguide circuit chip according to further another aspect of the invention is featured in that that the first and second optical waveguide circuits in the hybrid optical waveguide circuit chip are Mach-Zehnder type optical waveguide circuits.

Also, the present invention provides a method for predicting characteristics of the hybrid optical waveguide circuit chip, which comprises the steps of measuring optical characteristics of said second optical waveguide circuit by utilizing a second optical waveguide circuit having a termination end at both end faces of the hybrid optical waveguide circuit chip and predicting the optical characteristics of the measured second optical waveguide circuit as substantial optical characteristics of the first optical waveguide circuit.

The invention provides another method for predicting characteristics of the hybrid optical waveguide circuit chip, which comprises the steps of sampling one of a plurality of hybrid optical waveguide circuit chips formed from the same wafer; measuring the optical characteristics of the second optical waveguide circuit of the sampled hybrid optical waveguide circuit chip by utilizing the second optical waveguide circuit having a termination end at both end faces of the sampled hybrid optical waveguide circuit chip; and predicting the optical characteristics of the measured second optical waveguide circuit as substantial optical characteristics of the first optical waveguide circuits of all the hybrid optical waveguide circuit chips formed from the same wafer.

According to the invention, the second optical waveguide circuit is formed in the same hybrid optical waveguide circuit chip and both ends of at least one of optical waveguides of the corresponding second optical waveguide circuit are terminated at both chip end faces of the hybrid optical waveguide circuit chip, whereby such an excellent effect can be brought about, by which the optical characteristics of the first optical waveguide circuit, which are very difficult to be directly measured, can be predicted (or evaluated) from the results of measurement of optical characteristics of the second optical waveguide circuit for which the measurement is easy.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

Figure 1:
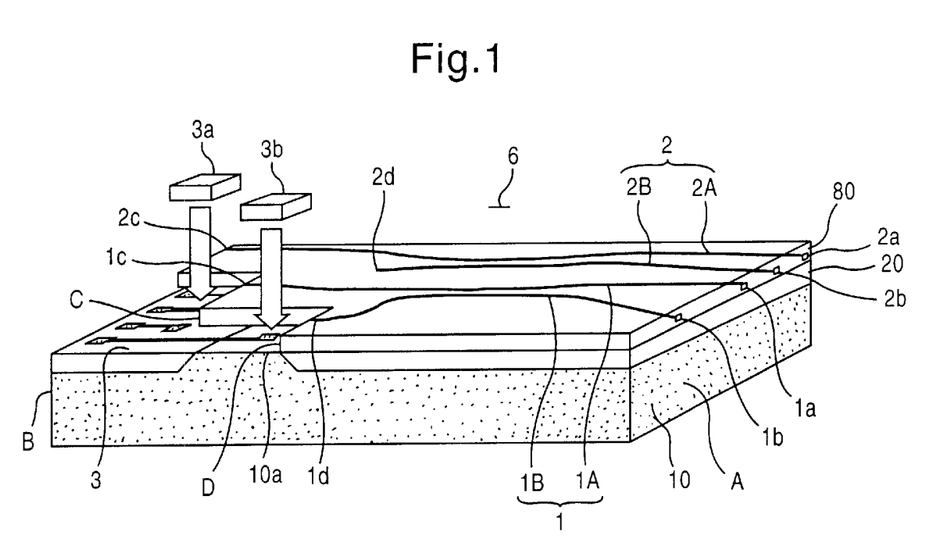
FIG. 1 is a view to describe a preferred embodiment of a hybrid optical waveguide circuit chip according to the invention.

Hereinafter, a detailed description is given of preferred embodiments of the invention with reference to the accompanying drawings;

FIG. 1 shows one preferred embodiment of a hybrid optical waveguide circuit chip 6 pertaining to the invention. Also, parts which corresponds to those illustrated in FIG. 6 are given the same reference numbers, and overlapping description thereof is omitted.

In the preferred embodiment, on a hybrid optical waveguide circuit chip 6, a lower cladding layer 20 is formed on a silicon (Si) substrate 10, and an optical waveguide layer 80 is formed thereon. The first optical waveguide circuit 1 having two cores 1A and 1B is provided on the optical waveguide layer 80. In the preferred embodiment, the first optical waveguide circuit is a waveguide circuit of a two-by-two directional coupler. End faces 1a and 1b at one side of the cores 1A and 1B of the first optical waveguide circuit 1 are terminated at one chip terminal end face A of the hybrid optical waveguide circuit 1, and end faces 1c and 1d at the other side of the cores 1A and 1B of the corresponding first optical waveguide circuit 1 are, respectively, terminated at respective end faces C and D of the optical waveguide layer 80 at the boundary portion of the surrounding portion 3 of the optical element incorporating portion.

Also, the second optical waveguide circuit 2 is provided adjacent to the first optical waveguide circuit 1 at the hybrid optical waveguide circuit chip 6, and the corresponding second optical waveguide circuit 2 is in the form of a waveguide circuit of a two-by-two directional coupler in which two cores 2A and 2B are formed on the optical waveguide layer 80. The portion, which determines the optical characteristics (in this case, the portion which determines the optically coupling characteristics), of the second optical waveguide circuit 2, and that of the first optical waveguide circuit 1 are made with the same shape. The end faces 2a and 2b at one side of the cores 2A and 2B of the second optical waveguide circuit are terminated at one chip end face A of the hybrid optical waveguide circuit chip 6, wherein the end face of at least one optical waveguide circuit of the end faces 2c and 2d at the other side of the cores 2A and 2B of the corresponding second optical waveguide circuit 2, that is, in the preferred embodiment, the end face 2c of the core 2A, is terminated at the other chip end face B of the hybrid optical waveguide circuit chip 6. Because both end faces 2a and 2c of at least one optical waveguide (core) 2A of the second optical waveguide circuit 2 are terminated at both end faces A and B of the hybrid optical waveguide circuit chip 6, it is possible to easily carry out measurement of the optical characteristics by connecting optical fibers to both ends (both end faces A and B of the hybrid optical waveguide circuit chip 6) of the second optical waveguide circuit 2. FIG. 2A through FIG. 2L are views to describe a manufacturing process showing one example of a method for manufacturing a hybrid optical waveguide circuit chip 6 according to the invention. A number of the hybrid optical waveguide circuit chips 6 may be produced on, for example, silicon wafer. However, in FIG. 2A through FIG. 2L, in order to make the description easier and to be more easily understood, the manufacturing process is illustrated in a state where the hybrid optical waveguide circuit chips are separated. The cross sections shown in FIG. 2A through FIG. 2L are sides, taken along the cutting line 8–8', of a hybrid optical waveguide circuit chip 6 illustrated in FIG. 3.

Hereinafter, a description is given of steps of the manufacturing process of a hybrid optical waveguide circuit chip 6.

Figure 2A:
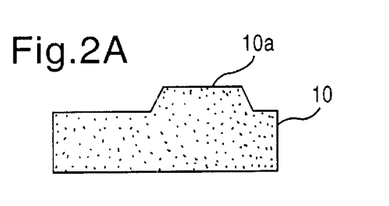
FIGS. 2A, 2B, 2C, 2D, 2E, 2F, 2G, 2H, 2I, 2J, 2K and 2L are views to describe a manufacturing process of a hybrid optical waveguide circuit according to the invention.

1) As shown in FIG. 2A, when manufacturing a hybrid optical waveguide circuit 6, (100) Si substrate 10 is etched by anisotropic etching, using KOH as an etchant, a level gap portion of an optical element incorporating portion 10a having an appointed planar pattern is formed on the surface of the Si substrate 10. The formation of the optical element incorporating portion 10a is carried out by providing a level gap of a predetermined pattern.

Figure 2B:
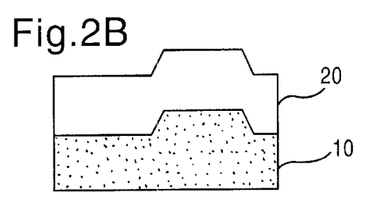

2) Next, as shown in FIG. 2B, a lower cladding layer 20 consisting of silica ($SiO_2$) based glass having a thickness of 50 μm or so is formed by an FHD method (Flame Hydrolysis Deposition Method). At this stage, the surface of the Si substrate is totally covered with a cladding layer 20. Also, a level gap will remain on the surface of the lower cladding layer 20 on the basis of the level gap of the optical element incorporating portion 10*a* formed on the Si substrate 10.

Figure 2C:
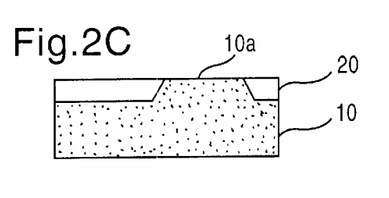

3) Next, as shown in FIG. 2C, the surface of the lower cladding layer 20 is flattened by mechanically polishing the surface thereof until the optical element incorporating portion 10*a* appears on the surface.

Figure 2D:
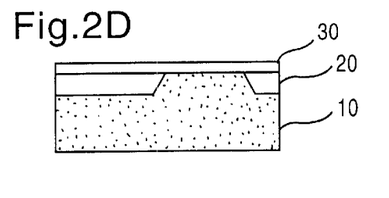

4) Next, as shown in FIG. 2D, a height adjusting layer 30, which consists of a silica ($SiO_2$) based glass having a refractive index equivalent to that of the lower cladding layer 20, is formed so as to have a thickness of approx. 10 $\mu$m by the FHD method.

Figure 2E:
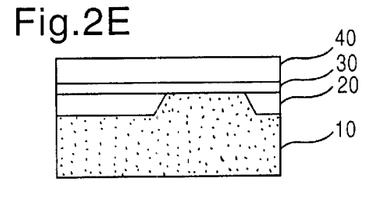

5) Next, as shown in FIG. 2E, a core layer 40 consisting of silica ($SiO_2$) based glass is formed so as to become approx. 7 $\mu$m thick by the FHD method. Herein, $GeO_2$ is doped so that the refractive index of the core layer 40 becomes greater by approx. 0.5% than that of the lower cladding layer 20 and height adjusting layer 30.

Figure 2F:
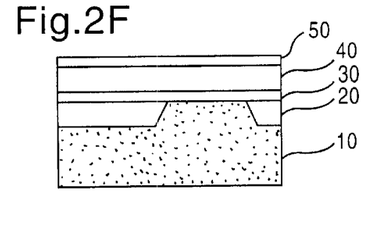

6) Next, as shown in FIG. 2F, an etching mask member 5 is formed on the upper part of the core layer 40.

Figure 2G:
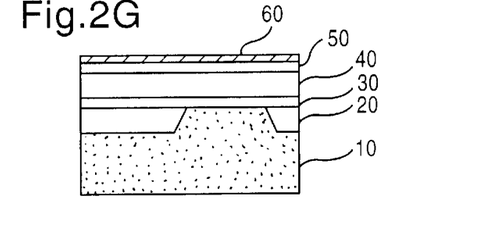
Figure 2H:
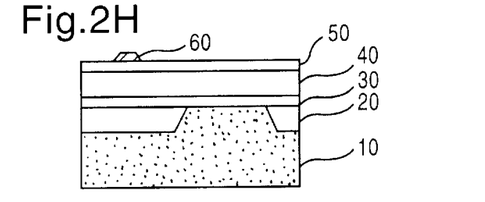

7) Next, as shown in FIG. 2G, photoresist 60 is coated onto the upper surface of the etching mask member 50, and as shown in FIG. 2H, the cores 1A and 1B of the first optical waveguide circuit 1, and the cores 2A and 2B of the second optical waveguide circuit 2 are transferred on the photoresist 60 by a photo lithography method.

A detailed description is given of an optical waveguide circuit of the invention, which is transferred by a photo lithography method. In the invention, the first optical waveguide circuit 1 optically coupled to optical elements, and the second optical waveguide circuit adjacent thereto are formed in the same hybrid optical waveguide circuit chip 6. The second optical waveguide circuit 2 has the same parameters as those of the first optical waveguide circuit 1. When forming these optical waveguide circuits 1 and 2, a photo mask is used, which has a core pattern in which both end sides of at least one core of the second optical waveguide circuit 2 are terminated at both end faces of the hybrid optical waveguide circuit chip 6. Also, a photo mask is used, which has a core pattern in which the second optical waveguide circuit 2 is disposed adjacent to the first optical waveguide circuit 1, so that the optical characteristic values of the second optical waveguide circuit 2 are made roughly equivalent to those of the first optical waveguide circuit 1.

Figure 3:
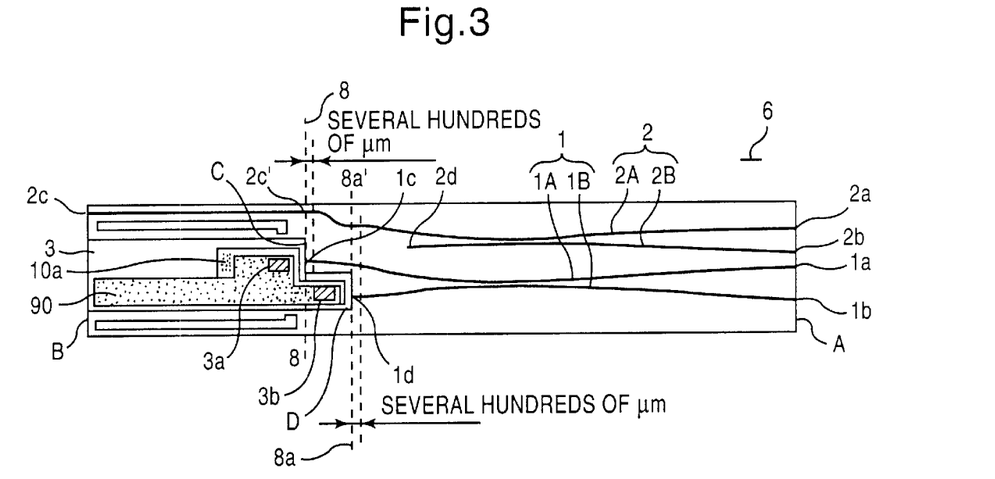
FIG. 3 is a view to describe a position for the cutting of a hybrid optical waveguide circuit chip to obtain a chip sample in order to investigate a correlation in characteristics between the first optical waveguide circuit and the second optical waveguide circuit of a hybrid optical waveguide circuit chip according to the invention.

Further, as shown in FIG. 3, both the first and second optical waveguide circuits 1 and 2 are constructed so as to have linear waveguides in a range of several hundreds of micro millimeters ($\mu$m) forward from the respective end faces C and D of the optical waveguide layer 80 where the cores 1A and 1B of the first optical waveguide circuit 1 at the surrounding portion of the optical element incorporating portion are terminated, so that the optical characteristic values of the second optical waveguide circuit 2 are measured in comparison with those of the first optical waveguide circuit 1 under the same conditions. This is because the hybrid optical waveguide circuit chip 6 is cut off at either one of the end face C or D of the optical waveguide layer 80 at which the first optical waveguide circuit 1 of the surrounding portion of the optical element incorporating portion is terminated, the optical characteristics of both the first and second optical waveguide circuits are measured, and evaluation of the uniformity of the optical characteristics of the first and second optical waveguides is made easier.

Further, the second optical waveguide circuit 2 is disposed in an empty area portion inherently secured in a hybrid optical waveguide circuit chip 6 as described above, whereby an attempt is made such that the size of the hybrid optical waveguide circuit chip 6 does not increase, and the number of the hybrid optical waveguide circuits 6 in one wafer is not reduced.

Figure 2I:
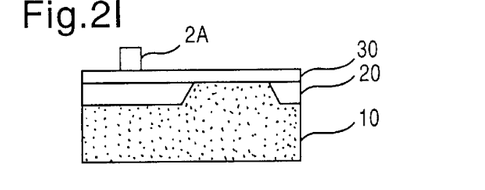

8) Next, as shown in FIG. 2I, the core layer 40 is etched by a reactive ion-etching method (RIE method), whereby the cores 1A and 1B of the first optical waveguide circuit 1 and the cores 2A and 2B of the second optical waveguide, each of which has the desired functions, are formed. Also, since FIGS. 2 show the cross section taken along the line 8–8 ' in FIG. 3, the end face of the core 2A is illustrated in FIG. 2I.

Figure 2J:
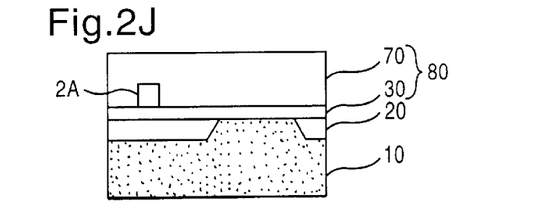

9) Next, as shown in FIG. 2J, by forming an upper cladding layer 70 made of silica ($SiO_2$) based glass having a refractive index matched to the lower cladding layer 20 by the RIE method, the abovementioned cores 1A, 1B, 2A and 2B are built in. Also, for the convenience, a combination of the above height adjusting layer 30, cores 1A, 1B, 2A and 2B, and upper cladding layer 70 is called an optical waveguide layer 80.

Figure 2K:
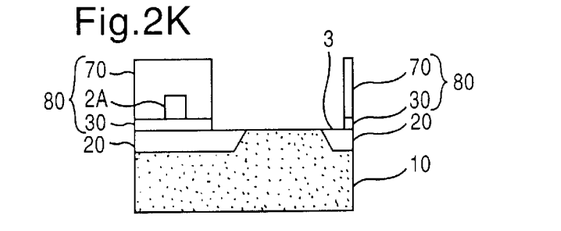

10) Next, as shown in FIG. 2K, the optical waveguide layer 80 on the surrounding area 3 of the optical element incorporating portion including the optical element incorporating portion 10*a* is eliminated by the RIE method to expose and form the surrounding area 3 of the optical element incorporating portion including the optical element incorporating portion 10*a*. Also, the optical element incorporating portion 10*a* and the surrounding area 3 of the optical element incorporating portion are located on the same plane.

Figure 2L:
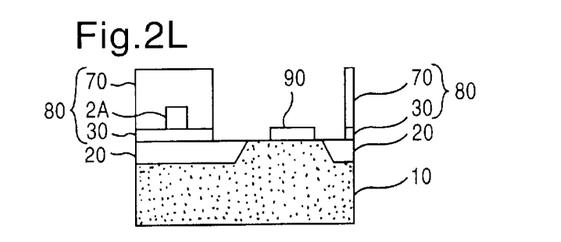

11) Subsequently, as shown in FIG. 2L, an electrode pattern 90 is formed, by the lift-off method, on a part of the optical element incorporating portion 10*a* and a part of the surrounding area 3 of the optical element incorporating portion.

Through the abovementioned processes, a hybrid optical waveguide circuit chip 6 having the second optical waveguide circuit 2 may be formed, which is able to measure optical characteristics by connecting optical fibers to the end faces of the hybrid optical waveguide circuit chip 6.

A method for evaluating the optical characteristics of the first optical waveguide circuit 1 of the hybrid optical waveguide circuit chip 6 is as follows; that is, the optical characteristics of the second optical waveguide circuit 2 are measured in the form of a chip, wherein the characteristic values thereof are regarded as the predicted values of the optical characteristics of the first optical waveguide circuit 1. Substantially, the optical characteristic values of the second optical waveguide circuit 2 are regarded as those of the first optical waveguide circuit 1.

Therefore, first, it is necessary to verify the prediction accuracy in the case where the optical characteristics of the first optical waveguide circuit 1 are predicted by using the optical characteristic values of the second optical waveguide circuit 2. The results thereof are described below:

FIG. 3 is a view to describe a method for manufacturing a chip sample used to investigate the accuracy in the case where the optical characteristics of the first optical waveguide circuit 1 of a hybrid optical waveguide circuit chip 6 of the invention are predicted by using the optical characteristics of the second optical wavelength circuit 2. The hybrid optical waveguide circuit chip 6 is cut off at a linear portion (cross section taken along the line 8–8' or cross section taken along the line 8*a*–8*a*' in FIG. 3) immediately before either one of the end face C or D of the optical waveguide layer 80 of the boundary portion of the surrounding area 3 of the optical element incorporating portion of the hybrid optical waveguide circuit chip 6. In the preferred embodiment, a chip sample is produced by cutting the optical waveguide circuit chip 6 on the cross section taken along the line 8–8' of the linear portion 8–8' immediately before the end face C of the optical waveguide portion 80 at the boundary portion with respect to the surrounding area of a light receiving element incorporating portion.

Figure 4:
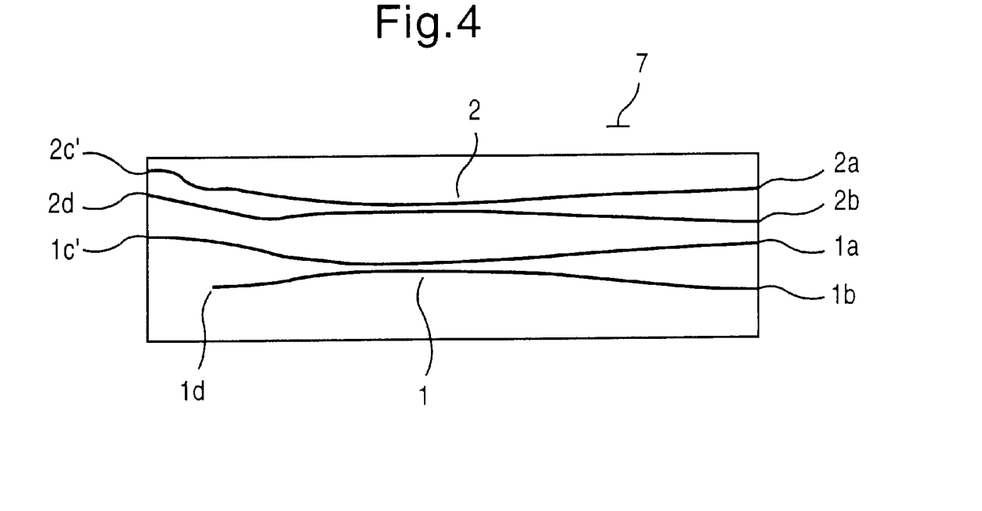
FIG. 4 is a view to describe a method for measuring the optical characteristics of the first optical waveguide circuit and the second optical waveguide circuit, using the chip sample cut off at the cutting position in FIG. 3.

FIG. 4 is a view of an optical waveguide circuit of the chip sample produced by cutting a hybrid optical waveguide circuit chip 7, and is a view of evaluating the accuracy in the case where the optical characteristics of the hybrid optical waveguide circuit chip 6 are predicted. In the cut off hybrid optical waveguide circuit chip illustrated in FIG. 4, the optical characteristics of the first optical waveguide circuit 1 and the second optical waveguide circuit 2 are measured as shown below. That is, with respect to each of the first optical waveguide circuit 1 and the second optical waveguide circuit 2, when light enters from the end faces 1a and 2a of the optical waveguide, the optical loss value $L_1$ of the light emitting to the respective optical waveguide end faces 1c' and 2c' (1c' and 2c' are the optical waveguide end faces of the cut-off faces, respectively, corresponding to 1c and 2c) is measured. Next, when light enters from the end faces. 1b and 2b of the optical waveguide, the optical loss value $L_2$ of the light emitting to the respective optical waveguide end faces 1c' and 2c' is measured.

As shown in expression (1) below, the absolute value of a difference between $L_1$ and $L_2$ which are measured in the first optical waveguide circuit 1, and the absolute value of a difference between $L_1$ and $L_2$ measured in the second optical waveguide 2 are defined as uniformity of the first optical waveguide circuit 1 and the second optical waveguide 2, each of which is a two-by-two directional coupler, whereby a comparison is made in terms of the characteristics of the first optical waveguide circuit 1 and the second optical waveguide 2.

$$U=|L_1-L_2| \quad (1)$$

where each symbol in the above expression (1) is as follows;

U: Uniformity (dB) of the two-by-two directional coupler $L_1$: Respective optical losses (dB) in channels where light is caused to enter from the respective optical waveguide end faces 1a and 2a and is emitted to the respective optical waveguide end faces 1c' and 2c'

$L_2$: Respective optical losses (dB) in channels where light is caused to enter from the respective optical waveguide end faces 1b and 2b and is emitted to the respective optical waveguide end faces 1c' and 2c'

FIG. 6 is a view showing correlation between the uniformity of the second optical waveguide circuit 2 (that is, the predicted uniformity of the first optical waveguide), which is obtained by measurement, and the uniformity of the first optical waveguide circuit 1. The number of the measured hybrid optical waveguide circuit chips 6 (the number of chip samples) is 250. As has been made clear from FIG. 6, it is found that the correlation between the uniformity of the second optical waveguide circuit 2 (that is, the predicted uniformity of the first optical waveguide circuit 1), and the uniformity of the first optical waveguide circuit 1 has high prediction accuracy in which the correlation coefficient is 0.8206. Therefore, the measured optical characteristics of the second optical waveguide circuit 2 can be substantially regarded as the optical characteristics of the first optical waveguide circuit 1. Accordingly, it will become possible to predict the optical characteristics of hybrid optical waveguide circuit chip at high accuracy before mounting light emitting and receiving elements.

Figure 5:
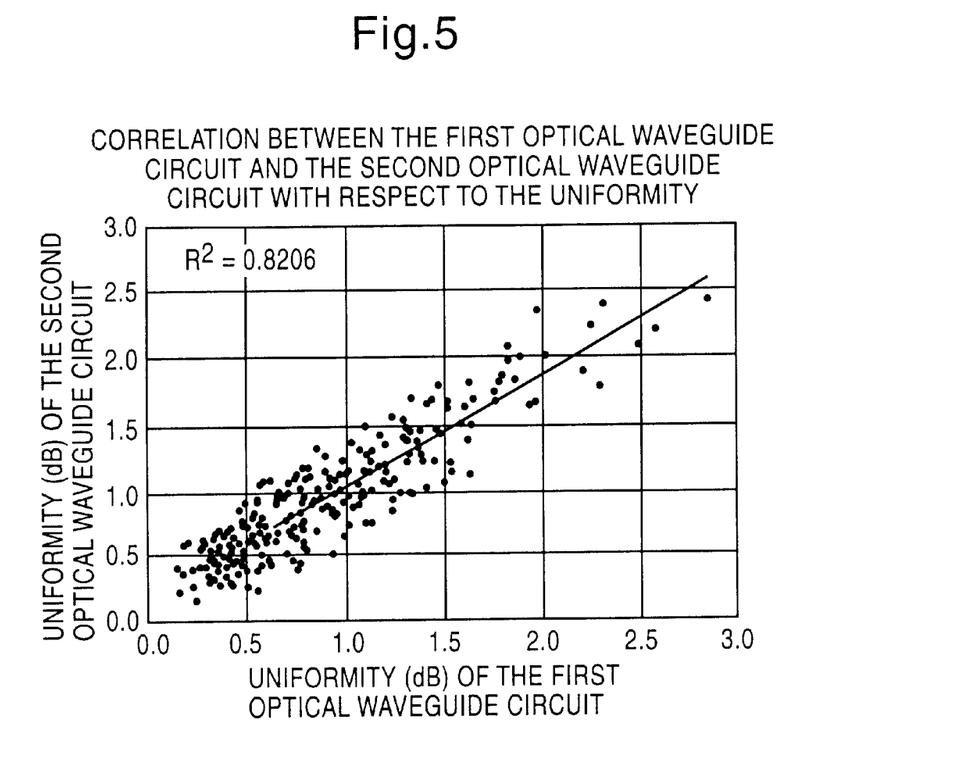
FIG. 5 is a correlation view between the uniformity of the second optical waveguide circuit (uniformity for prediction of the first optical waveguide circuit) of the second optical waveguide circuit of a hybrid optical waveguide circuit chip, which is obtained by the measuring method explained in FIG.4, and uniformity of the first optical waveguide circuit.

Further, an optical waveguide circuit chip may be cut off on the cross section taken along the line 8a–8a' of the linear portion immediately before the light emitting element 3b shown in FIG. 3 for measurement, whereby correlation between the uniformity of the second optical waveguide circuit 2 (that is, the predicted uniformity of the first optical waveguide circuit 1) and the uniformity of the first optical waveguide circuit 1 may be obtained. In this case, the results as shown in FIG. 5 can be obtained, whereby it is confirmed that high prediction accuracy can be obtained.

In reality, because the optical characteristics of the second optical waveguide circuit 2 of a hybrid optical waveguide circuit chip 6 is measured not in the form of chip samples but in the form of a hybrid optical waveguide circuit chip 6 before optical elements are mounted, that is, the measurement is carried out with optical fibers connected to the respective ends 2a, 2b and 2c of the second optical waveguide circuit 2, a loss of the optical waveguide portion from 2c' to 2c is further added to the measured values of L1 and L2 in this case than in the case of having measured optical characteristics in the form of chip samples. Therefore, because the increment of the loss is counterbalanced by a calculation made by the expression (1) by which the uniformity is obtained, the value of the uniformity becomes identical to that in the case of obtaining the uniformity in the form of chip samples. Therefore, it is found that, by measuring the optical characteristics (uniformity) of the second optical waveguide circuit 2 in the form of a hybrid optical waveguide circuit chip 6 before optical elements are mounted, the measured values can be predicted as values of the optical characteristics (uniformity) of the first optical waveguide circuit 1 at high prediction accuracy shown in the above drawing FIG.5. As the results of the prediction, since no optical element is mounted on a hybrid optical waveguide circuit chip 6 which comes outside the standard or limits of the optical characteristics, expensive optical elements are not uselessly used, time and labor required for mounting thereof can be omitted, whereby production cost of hybrid optical components can be remarkably reduced.

In the preferred embodiment, although a description was given of a hybrid optical waveguide circuit chip 6 using silica ($SiO_2$) based optical waveguides, the present invention is not limited to the above case. That is, the invention is applicable to a hybrid optical waveguide circuit chip being a polymer-based or semiconductor-based optical waveguide.

Also, an optical circuit in which a hybrid optical waveguide circuit chip 6 is used is not limited to a directional coupler, but it may be applicable to various types of optical waveguide circuits such as a branching circuit, a wavelength multiplexing and demultiplexing circuit, an optical switch, etc.

Further, as regards the measurement of optical characteristics of the second optical waveguide circuit 2 in the abovementioned example, the example in which measurement is carried out on individual chips cut out from wafer (silicon wafer). However, the measurement is not limited to the above case. That is, optical characteristics of the second optical waveguide circuit 2 can be measured on the stage where only both end faces A and B of chips are cut out, and the chips are linked with each other like a strip of paper. In this case, there is no problem even though a part of the second optical waveguide circuit 2 is cut off in the cutting-out process of individual chips after the measurement is completed.

Generally, because a plurality of hybrid optical waveguide circuit chips formed on a single sheet of wafer are produced under the same conditions, the optical characteristics of individual hybrid optical waveguide circuit chips are almost the same. Therefore, one of the plurality of hybrid optical waveguide circuit chips formed from the same wafer is sampled, the optical characteristics of the second optical waveguide circuit 2 of the sampled hybrid optical waveguide circuit chip are measured, whereby the measured values can be predicted as substantial optical characteristics of the first optical waveguide circuit 1 in all the hybrid optical waveguide circuit chips formed from the same wafer. By employing such a prediction method, the optical characteristics of a number of hybrid optical waveguide circuit chips can be easily and further efficiently evaluated.

What is claimed is:

1. A hybrid optical waveguide circuit chip comprising an optical element incorporating portion in which optical elements are incorporated, and a first optical waveguide circuit optically connected to said optical elements, wherein one end face of the first optical waveguide circuit is terminated at one chip end face of the hybrid optical waveguide circuit chip, the other end face of the first optical waveguide circuit is terminated at the respective end faces of the optical waveguide layers at the boundary portion at the surrounding area of the optical element incorporating portion, a second optical waveguide circuit for measuring predetermined optical characteristics is disposed adjacent to said first optical waveguide circuit, one end face of said second optical waveguide circuit is terminated at one chip end face of the hybrid optical waveguide circuit chip, at least one of the optical waveguide end faces at the other end face of said second optical waveguide circuit is terminated at the other chip end face of the hybrid optical waveguide circuit chip, and portions to determine the predetermined optical characteristics of both the first optical waveguide circuit and the second optical waveguide circuit are formed to have substantially the same shape.

2. A hybrid optical waveguide circuit chip as set forth in claim 1, wherein the first and second optical waveguide circuits in the hybrid optical waveguide circuit chip are optical waveguide circuits of a two-by-two directional coupler.

3. A hybrid optical waveguide circuit chip as set forth in claim 1, wherein the first and second optical waveguide circuits in the hybrid optical waveguide circuit chip are Mach-Zehnder type optical waveguide circuits.

4. A method for predicting characteristics of a hybrid optical waveguide circuit chip as described in any one of claims 1 through 3, the method comprising the steps of:

measuring optical characteristics of said second optical waveguide circuit by utilizing a second optical waveguide circuit having a termination end at both end faces of the hybrid optical waveguide circuit chip; and predicting the optical characteristics of the measured second optical waveguide circuit as substantial optical characteristics of the first optical waveguide circuit.

5. A method for predicting characteristics of a hybrid optical waveguide circuit chip as described in any one of claims 1 through 3, the method comprising the steps of:

sampling one of a plurality of hybrid optical waveguide circuit chips formed from the same wafer;

measuring the optical characteristics of the second optical waveguide circuit of the sampled hybrid optical waveguide circuit chip by utilizing the second optical waveguide circuit having a termination end at both end faces of the sampled hybrid optical waveguide circuit chip; and predicting the optical characteristics of the measured second optical waveguide circuit as substantial optical characteristics of the first optical waveguide circuits of all the hybrid optical waveguide circuit chips formed from the same wafer.

\* \* \* \* \*